United States Patent
Weldy

[11] Patent Number: 5,975,828
[45] Date of Patent: Nov. 2, 1999

[54] TRAILER TILT SYSTEM

[76] Inventor: Ross A. Weldy, 2505 Waterbend Dr., Elkhart, Ind. 46514

[21] Appl. No.: 08/915,224

[22] Filed: Aug. 20, 1997

Related U.S. Application Data

[60] Provisional application No. 60/042,136, Apr. 8, 1997.
[51] Int. Cl.⁶ ............................................. B60P 1/04
[52] U.S. Cl. .................... 414/484; 414/485; 414/812
[58] Field of Search ........................... 414/482–485, 414/812

[56] References Cited

U.S. PATENT DOCUMENTS

| | | | |
|---|---|---|---|
| 2,919,825 | 1/1960 | Hornsby | 414/483 X |
| 2,990,966 | 7/1961 | Schramm | 414/484 X |
| 3,335,887 | 8/1967 | Snook | 414/484 X |
| 3,764,031 | 10/1973 | Parsen | 414/485 |
| 4,290,733 | 9/1981 | Lahman | 414/484 X |
| 5,090,718 | 2/1992 | Kauffman | 414/485 X |
| 5,195,764 | 3/1993 | Schantz et al. | 414/483 X |

*Primary Examiner*—David A. Bucci
*Attorney, Agent, or Firm*—Barnes & Thornburg

[57] ABSTRACT

A suspension system for wheeled vehicles which allows the body or frame of a vehicle, such as a trailer, to be lowered or tilted. The suspension system includes an off-set axle which, when rotated, adjusts the clearance beneath the wheeled vehicle so that the body or frame thereof can be lowered or tilted. The off-set axle includes a central portion which can be rotated by applying tension to a tensioning member attached thereto. In one embodiment the tensioning member is coupled to a shuttle which in turn is detachably coupled to another tensioning member that can be detached from the shuttle and used to pull a load onto the vehicle. The shuttle can be used to transfer tension between the tensioning members and lock the axle into a desired position.

23 Claims, 5 Drawing Sheets

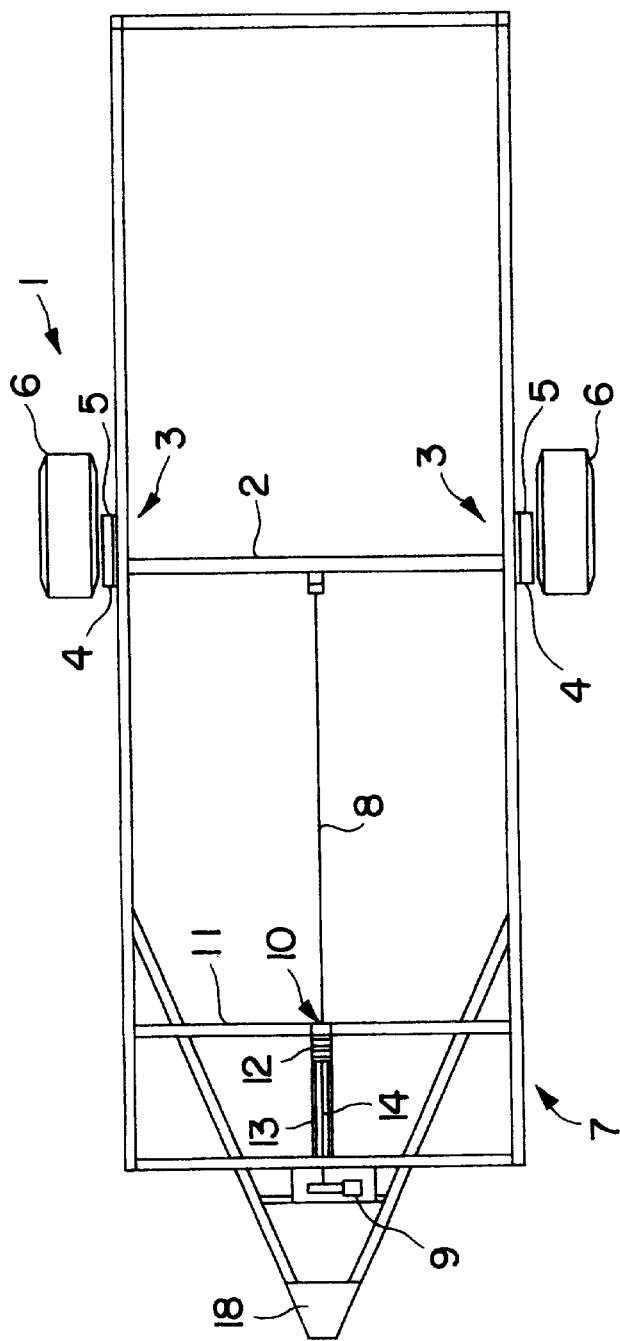
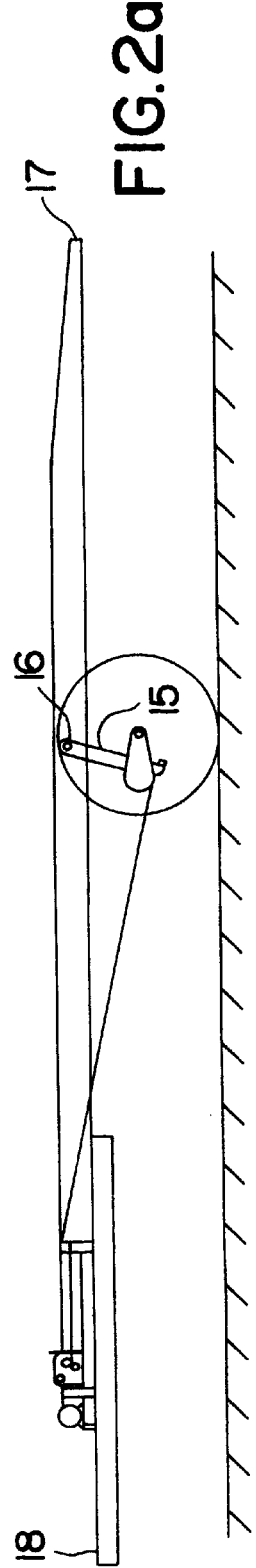
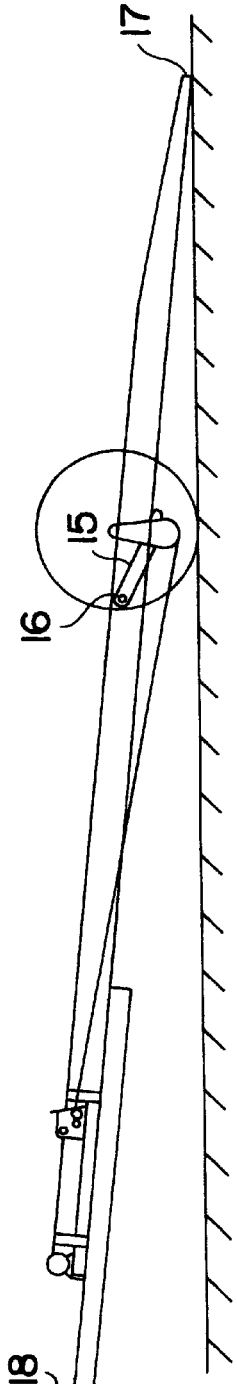

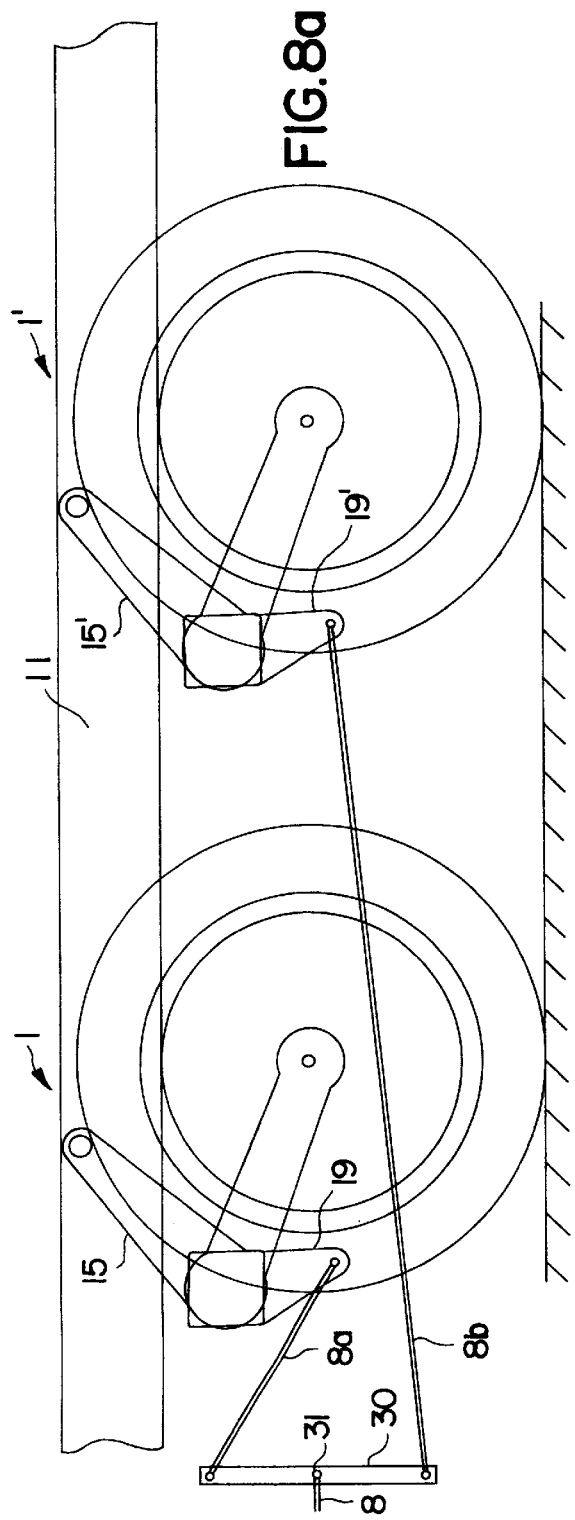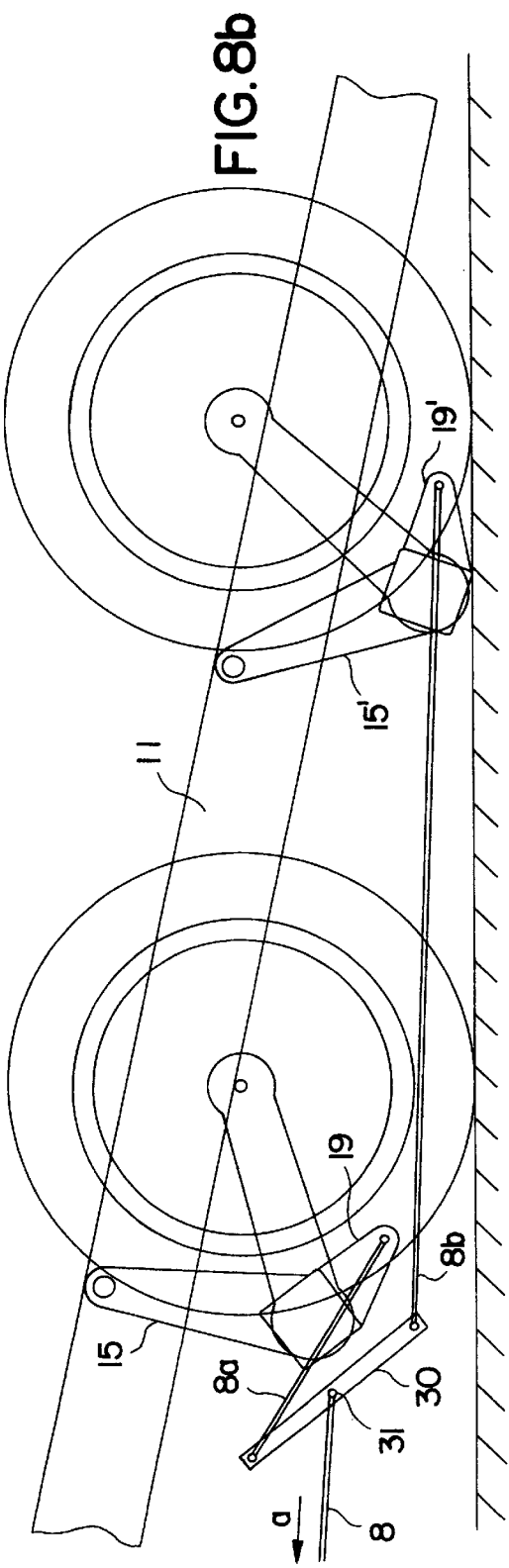

TRAILER TILT SYSTEM

RELATED APPLICATIONS

This application is based upon Provisional Application Ser. No. 60/042,136, filed Apr. 8, 1997.

TECHNICAL FIELD

The present invention relates to a suspension system for wheeled vehicles. More particularly, the present invention relates to suspension systems for wheeled vehicles which allow the bed of such wheeled vehicles to be lowered.

BACKGROUND ART

There are a number of wheeled devices which are used to haul various articles such as boat trailers which are used to haul boats, flat bed trailers which are used to haul automobiles, trucks, farm equipment, etc., small trailers which are used to haul lawn mowing equipment, motorcycles, snowmobiles, and the like.

In order to haul loads, trailers need to provide a bed or load-bearing platform which is spaced above the ground by a suitable clearance distance. Moreover, it is generally desired to maintain such beds or load-bearing platforms level during transportation, so that loads provided thereon do not shift.

Loading trailers with loads which cannot be easily lifted can be difficult. In order to do so, trailers are often tilted or tipped upward at their front ends so that their back ends become positioned near the ground. Such a procedure can become dangerous when the center of mass of a heavy load being pulled onto the trailer passes over the wheel axle and the weight thereof causes the trailer to level itself.

Trailers have been developed to include hinged rear sections which can be tilted separately so that the rear of such trailers can be lowered near the ground while the front of such trailers can remain level and optionally secured to a towing vehicle.

The tilting of trailers or trailer sections to lower the rear portion thereof near the ground is limited by the height of the trailer beds or platforms over the wheel axle. This clearance height dictates the angle at which the rear portion of a trailer can be aligned with respect to the ground. For loads which have a low ground clearance, it may not be possible to achieve a suitable trailer tilt angle which will prevent such loads from bottoming out when they are pulled or pushed onto a trailer.

The present invention provides a suspension system for trailers and other wheeled vehicles which allows the beds or platforms of such devices to be lowered.

DISCLOSURE OF THE INVENTION

Among other features, the present invention provides a suspension system for wheeled vehicles which allows the beds, frames or platforms of such wheeled vehicles to be lowered or tilted.

The present invention further provides for a means to lock the suspension systems into desired positions so that the wheeled vehicles can be maintained at a desired clearance for transportation.

The present invention further provides a tensioning assembly for the suspension systems which includes a shuttle that can be coupled between two tensioning members, one of which, when disconnected from the shuttle, can be used to pull a load or object onto a wheeled vehicle, e.g. trailer bed or platform.

The present invention also provides for a wheeled vehicle which includes the suspension system. The wheeled vehicle can include one or more axles which can be rotated to raise, lower or tilt the vehicle frame.

The present invention also provides for a method of loading a wheeled vehicle having a frame and an axle which method involves lowering at least a portion of the vehicle by rotating the axle relative to the frame thereof and loading the vehicle while the portion thereof is lowered.

BRIEF DESCRIPTION OF DRAWINGS

The present invention will be described hereafter with reference to the attached drawings which are given as non-limiting examples only, in which:

FIG. 1 is a top schematic view of a suspension system according to one embodiment of the present invention.

FIGS. 2a and 2b are side schematic views which depict how the suspension systems of the present invention function to lower the bed or platform of a trailer or other wheeled vehicle.

FIGS. 8a and 8b are side schematic views which depict an embodiment of the suspension system of the present invention that includes means for distributing the load applied to tandem axles.

BEST MODE FOR CARRYING OUT THE INVENTION

Figure 3:
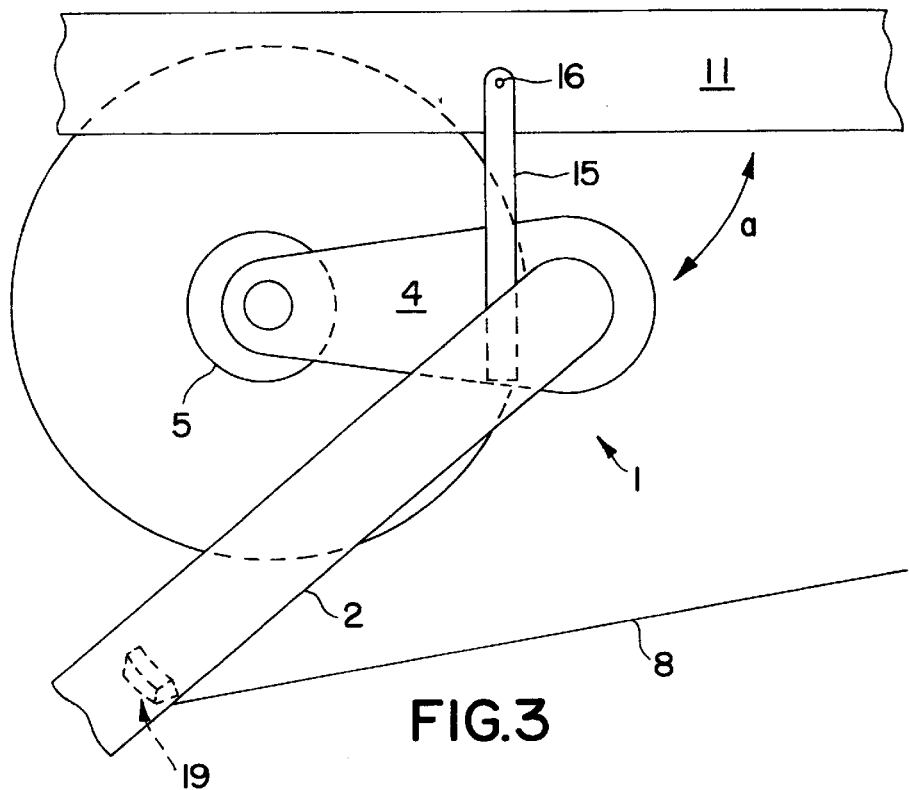
FIG. 3 is side schematic view of the suspension system according to one embodiment of the present invention.

The present invention is directed to suspension systems for wheeled vehicles which allow the frame, bed or platform of such wheeled vehicles to be lowered or tilted. The suspension systems of the present invention can be utilized in conjunction with trailers and other wheeled vehicles which include more than one axle, and in such cases can be applied so that the beds or platforms of such wheeled vehicles can be lowered with respect to one or more of the axles.

The ability to lower the bed or platform of a trailer or other wheeled vehicle with respect to the wheel axle(s) thereof, allows for either the entire bed or platform to be lower for loading purposes, or for the combination of lowering and tilting of an end of a trailer or other wheeled vehicle so as to greatly reduce the "ramp angle" thereof. As used herein, the term "ramp angle" refers to the obtuse angle at which the bed or platform intersects the ground.

The suspension systems of the present invention utilizes one or more axles which have wheels which are off-set with respect to a central portion of the axles. Rotation of the axles with respect to the bed or platform of a vehicle causes the bed or platform to raise and lower.

Several different means to effect rotation of the wheel axle(s) are provided by the present invention. According to one embodiment, a linkage system which includes a tensioning member attached to a central portion of the axle(s) is used to rotate the axle(s). Tension can be applied to the tensioning member by means of a winch or similar tensioning means as discussed below. The winch can be manually operated or mechanically operated.

According to one embodiment of the present invention, a shuttle is coupled between a tensioning member that is coupled to the axle and a tensioning member which is coupled to a tensioning means, e.g. winch. The shuttle is provided with a locking structure. The locking structure allows the shuttle to be locked in a desired position so that the tensioning member coupled to the tensioning means can be detached from the shuttle and used to pull a load onto a wheeled vehicle, e.g. trailer.

In other embodiments, the tensioning member could be attached to arm members that are fixed to opposite ends of the central portion of the axles. In further embodiments, a mechanical driving means such as a gear, pinion, chain or belt drive could be directly coupled to the axle so as to engage and rotate the central portion thereof. It is also possible to utilize more than one tensioning member and more than one tensioning means and to include guide structures to properly align these elements.

FIG. 1 is a top schematic view of a suspension system according to one embodiment of the present invention. The suspension system of the present invention includes at least one wheel axle assembly 1 which has a central portion 2 and off-set ends 3. The off-set ends 3 include arm members 4 which are attached to the ends of the central portion 2 of the wheel axle assembly 1. One end of each arm member 4 is fixedly attached to an end of the central portion 2. An opposite end of each arm member 4 is coupled to a wheel bearing assembly 5 to which a wheel 6 can be rotatably attached in a conventional manner. The wheel axle assembly 1 is referred to herein as being off-set because the central portion 2 of the axle is not axially aligned with the central axes of the wheel bearing assemblies 5. The wheel bearing assemblies 5 themselves are coaxial with respect to one another.

It can be understood from FIG. 1 that rotation of the central portion 2 of the wheel axle assembly 1 will cause the wheel bearing assemblies 5 and wheels 6 to rotate through an arc having a radius which is defined by the length of the arm members 4 and which is centered about the axis of the central portion 2. As discussed and illustrated below, rotation of the central portion 2 can be used to effect the lowering, raising, or tilting of a trailer bed or platform.

FIG. 1 depicts an arrangement in which the arm members 4 of the wheel axle assembly 1 extend toward the rear of the trailer 7 from the ends of the central portion 2. From the following description it will be understood that the arm members 4 of the wheel axle assembly 1 could extend toward the front of the trailer 7, in which case the bed of the trailer 7 would be raised and lowered by rotating the central portion 2 of the wheel axle assembly 1 in opposite directions to those used in the arrangement of FIG. 1.

A linkage system is used to effect rotation of the central portion 2 of the wheel axle assembly 1. The linkage system can include a manual or mechanical means to effect rotation of the central portion 2 of the wheel axle assembly 1.

FIG. 1 depicts a linkage system that includes a tensioning member 8 which can be a cable, chain, wire, strap, etc. The tensioning member 8 is connected between the central portion 2 of the wheel axle assembly 1 and a tensioning means 9 and passes through a guide means 10. The guide means 10 is preferably attached to the frame 11 of the trailer 7 and causes tensioning member 8 to be pulled at an angle which causes the central portion 2 of the wheel axle assembly 1 to rotate when the tensioning means 9 is activated.

FIG. 1 depicts an embodiment in which a single tensioning member 8 is used to rotate the central portion 2 of the wheel axle assembly 1. This single tensioning member 8, e.g. cable, passes over or through the guide means 10 which causes the tensioning member 8 to be pulled upward when tension is applied thereto.

The tensioning means 9 may include a manual or mechanically operated winch having a rotatable drum, a screw driven shuttle, a pinion driven shuttle, a pneumatic or hydraulic driven shuttle or piston, a cammed linkage, or other equivalent means for applying tension to the tensioning member 8. The tensioning means 9 can be designed to be manually operated, or mechanically operated by means of a motor, engine, hydraulic or pneumatic means.

The guide means 10 in FIG. 1 may include a roller over which the tensioning member 8 passes to align the tensioning member 8 with the tensioning means 9. The guide means 10 is depicted as being coupled to a cross member or frame 11. It is to be understood that the guide means 10 could be provided nearer the wheel axle assembly 1 in FIG. 1 if desired.

FIG. 1 depicts the tensioning member 8 as being attached to the center of the central portion 2 of the wheel axle assembly 1. In alternative embodiments more than one tension member 8 could be attached to the central portion 2 of the wheel axle assembly 1 and used to effect rotation of the wheel axle assembly 1. Such plural tensioning members 8 could be spaced evenly along the central portion 2. For example, according to one embodiment a pair of tensioning members 8 were coupled adjacent the ends of the central portion 2. A single or plural tensioning means 9 could be used in conjunction with plural tensioning members 8. Each tensioning member 8 could be provided with a guide means 10.

FIG. 1 depicts an embodiment in which the tensioning member 8 is attached to a lockable shuttle 12 which can slide along track member 13. In this embodiment, the linkage system includes a primary tensioning member 14, e.g. a cable, chain, etc. which can be detachably secured to shuttle 12 and used to pull tensioning member 8. The shuttle 12 can be locked into any desired position by means of a locking pin arrangement, and the primary tensioning member 14 can be detached from the shuttle 12 and used to pull a load onto the trailer. The primary tensioning member 14 can be detachably connected to the shuttle 12 by means of a hook, loop, eyelet, pin, etc. which can be attached to the shuttle 12. In a more simplified embodiment, the shuttle 12 could be replaced by cooperating hooks or other engagement means on the adjacent ends of the primary tensioning member 14 and the tensioning member 8 which is coupled to the wheel axle assembly 1.

FIGS. 2a and 2b are side schematic views which depict how the suspension systems of the present invention functions to lower the bed or platform of a trailer or other wheeled vehicle.

In FIGS. 2a and 2b the wheel axle assembly 1 is depicted as being pivotally attached to the trailer frame 11 by a bracket 15. Bracket 15 allows the central portion 2 of the wheel axle assembly 1 to rotate about an arc, and the wheel bearing assemblies 5 to rotate about the pivot point 16 of the bracket 15.

FIG. 2a depicts the trailer platform or bed in its upright position. In this position, the central portion 2 of the wheel axle assembly 1 is located at approximately the maximum distance it can be from the bed or platform (or frame 11) as depicted. In this position, the bed or platform of the trailer 7 should preferably be substantially level. In this position, the tensioning member 8 is pulled by tensioning means 9 so that the shuttle 12 is at a forward most position as depicted. The shuttle 12 can be locked in the position depicted in FIG. 2a by a locking means discussed herebelow.

The trailer bed or platform is lower or tilted from the position depicted in FIG. 2a to the position depicted in FIG. 2b, by releasing the tension on tension member 8. This is accomplished by reversing the tensioning means 9 and paying out the tensioning member 8. In the embodiment depicted in FIG. 2b, reversing the tensioning means 9 (and unlocking shuttle 12) causes shuttle 12 to move to a rearward position. As the tensioning member 8 slides rearward across or through guide 10, the weight of the trailer 7 causes the wheel axle assembly 1 to rotate about pivot point 16. This rotation causes the distance between the central portion 2 of the wheel axle assembly 1 and the bed or platform (or frame 11) to decrease until the central portion 2 of the wheel axle assembly 1 nears and/or butts the lower portion of the frame 11 as depicted, or until the rear end 17 of the trailer bed or platform contacts the ground.

The trailer bed or platform is raised from the position depicted in FIG. 2b by actuating the tensioning means 9 and pulling tensioning member 8 toward the front of the trailer 7. This forward movement of the tensioning member 8 causes the wheel axle assembly 1 and wheel bearing assemblies 5 to rotate about pivot point 16 in a clockwise direction as depicted in FIGS. 2a and 2b.

It is to be understood from FIGS. 2a and 2b that the rotation of the wheel axle assembly 1 and wheel bearing assemblies 5 causes the bed of the platform of the trailer 7 to raise and lower with respect to the surface on which the trailer is supported. The actual "tilting" depicted in FIGS. 2a and 2b is effected by maintaining the height of the tongue 18 or front of the trailer 7. This can be accomplished by maintaining the attachment of the tongue 18 of the trailer 7 to a trailer hitch, jack, or other support.

FIG. 3 is a perspective view of the suspension system according to one embodiment of the present invention as viewed from beneath the trailer. In the embodiment of the suspension system depicted in FIG. 3, the bracket 15 which is used to pivotally mount the wheel axle assembly 1 to the trailer frame 11 is attached to arm 4 at an inside position, preferably near or against the central portion 2 of the wheel axle assembly 1. The pivot point 16 of the suspension system is depicted from inside the frame 11. The bracket 15 can be attached to the frame 11 by a shoulder bolt or any convenient mechanical means which allows the bracket 15 and wheel axle assembly 1 to pivot.

In FIG. 3, the central portion 2 of the wheel axle assembly 1 is depicted as being in an intermediate position. That is, as can be seen, the wheel axle assembly 1 in FIG. 3 can be rotated in either direction indicated by double-headed arrow "a" by applying tension to or releasing tension from tensioning member 8. For example, releasing tension on tensioning member 8 would allow the wheel axle assembly 1 to rotate clock-wise in FIG. 3 until the arm 4 abuts frame 11. Applying tension to tensioning member 8 would cause the wheel axle assembly 1 to rotate counter clock-wise. The extent to which the wheel axle assembly 1 can be rotated forward and/or rearward can be controlled by providing stops, e.g. abutment structures. Alternatively, the forward rotation of the wheel axle assembly 1 can be limited by the position at which the tensioning member 8 is attached to the central portion 2 of the wheel axle assembly. FIG. 3 depicts a bracket 19 by which the tensioning member 8 can be attached to the central portion 2 of the wheel axle assembly 1. This bracket 19 can extend radially outward from the central portion 2 of the wheel axle assembly 1 to provide leverage to rotate the wheel axle assembly 1 if desired. Moreover, this bracket 19 could include a slot or other guide structure for receiving the tensioning member 8 if desired.

Figure 4:
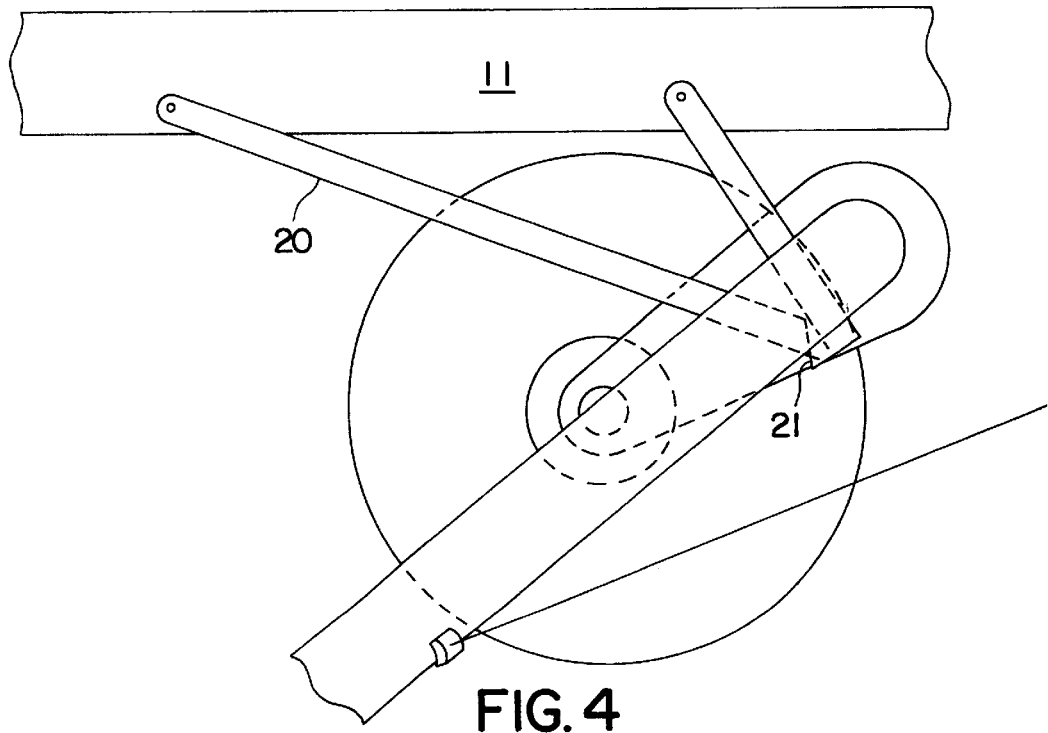
FIG. 4 is a side schematic view of the suspension system according to another embodiment of the invention.

FIG. 4 is a perspective view of the suspension system according to another embodiment of the present invention as viewed from beneath the trailer 7. This embodiment illustrates the use of a brace member 20 which can be used to brace the wheel axle assembly 1 when the bed of the trailer 7 is in its upper most position. The use of the brace member 20 will prevent the tensioning member 8 from supporting the entire weight of the trailer during transportation. Brace member 15 is depicted as being attached to frame 11 by a pivotal or pinned connection. The opposite end of brace member 20 is received in a recess 21 located at an end of bracket 15. It is to be understood that a similar brace located anywhere between the trailer frame 11 and any portion of the wheel axle assembly 1 could be used in place of the brace member 20 depicted in FIG. 4.

Figures 5, 6, 7:
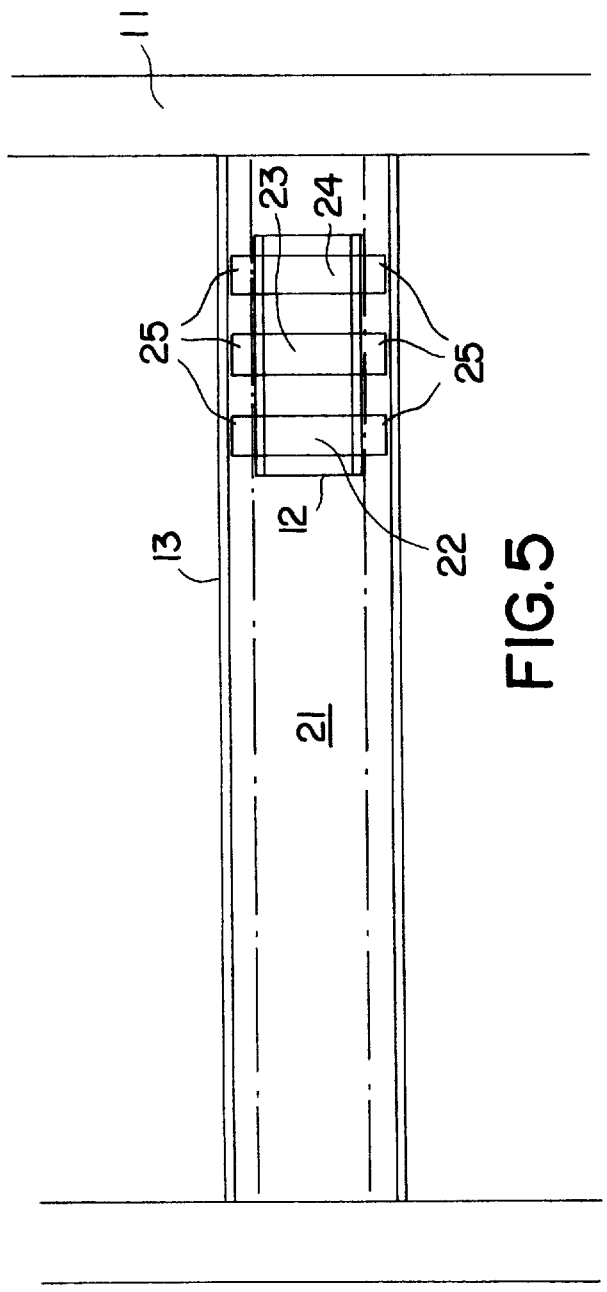
FIG. 5 is a schematic top view of the shuttle assembly according to one embodiment of the present invention.
FIG. 6 is a schematic end view of the shuttle assembly of FIG. 5.
FIG. 7 is a sectional view of the shuttle assembly of FIG. 5.
Figure 9:
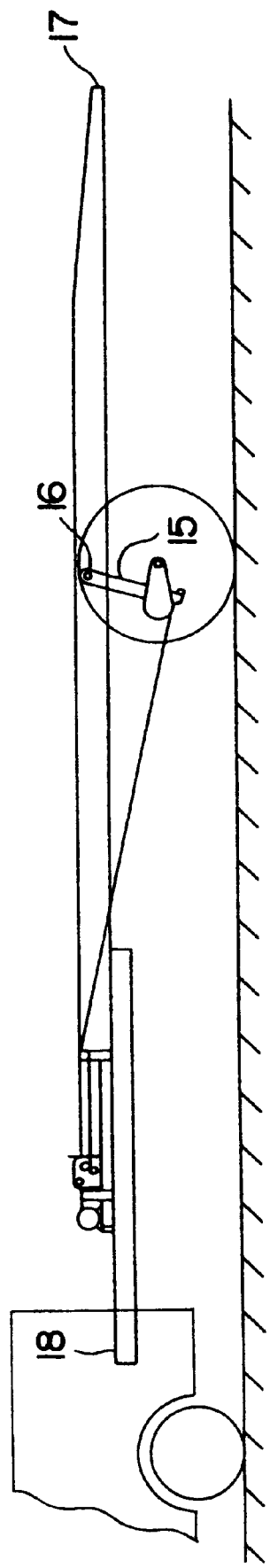
FIG. 9 is a side schematic of the suspension system on a truck.

FIG. 5 is a schematic top view of the shuttle assembly according to one embodiment of the present invention. The shuttle assembly includes a rail or track 13 having a channel 21 therein in which shuttle 12 can slide back and forth. The shuttle 12 includes a plurality of dowels 22, 23, 24 which extend therethrough. The dowels 22, 23, 24 maintain the alignment of the shuttle 12 within channel 21 of the rail or track 13. In this regard, the ends of the dowels 22, 23, 24 can be provided with rollers 25 which allow the shuttle 12 to move smoothly along rail or track 13.

FIG. 6 is a schematic end view of the shuttle assembly of FIG. 5. As seen in FIG. 6, the channel 21 may include inward projecting upper side portions 26. These inward projecting upper side portions 26 can be used to secure the shuttle 12 within the channel 21. For example, as depicted, one of the dowels 22 can engage the top surfaces of the side portions 26 of the channel and another one of the dowels 24 can engage the lower surfaces thereof. The number and alignment of the dowels and optional rollers which are used to maintain the alignment of the shuttle 12 in channel 21 can be varied as desired. That is, more or additional dowels can be used than shown in FIGS. 5–7.

FIG. 7 is a sectional view of the shuttle assembly of FIG. 5. FIG. 7 depicts the end of a tensioning member 8 attached to dowel 23 as depicted. In the illustrated embodiment, the end of the tensioning member 8 is attached to dowel 23 by a loop formed therein. Other suitable means such as a hook, eyelet, etc. could be used to attach the tensioning member 8 to dowel 23.

The primary tensioning member 14 discussed above can be attached to dowel 22 and used to pull the shuttle 12 along rail or track 13. The primary tensioning means 14 can be attached to dowel 22 by means of a hook, clip, or other suitable detachable means.

A locking pin 27 is attached to dowel 24 so that the locking pin 27 can be rotated about or with dowel 24. Rotation of the locking pin 27 allows the locking pin 27 to be positioned in a slot 28 which is provided in the bottom of channel 21. By allowing the locking pin 27 to rotate freely with dowel 24, the locking pin 27 can drop or fall into slot 28 and thereby automatically lock the shuttle 12 into position. From this position, applying a small amount of tension to the primary tensioning member 14 will allow the locking pin 27 to be moved out of slot 28 so that the shuttle 12 can be slid to its rearward position. It is to be understood that other locking structures can be used in place of locking pin 27, such as a pin which is passed through the side walls of rail or track 13, a pivotal cleat which can engage spaced slots of teeth in the rail or track 13, a spring biased detent, or similar structures.

FIGS. 8a and 8b are side schematic views which depict an embodiment of the suspension system of the present invention that includes means for distributing an uneven load applied to tandem axles. The means for distributing loads applied to wheel axle assemblies 1 and 1' is a self-adjusting mechanism that includes a force distribution bar 30 which is pivotally connected to tensioning member 8 and secondary tensioning members 8a and 8b. Secondary tensioning members 8a and 8b are connected between the ends of force distribution bar 30 and brackets 19 and 19'.

As depicted tensioning member 8 applies a force to force distribution bar 30 along a direction indicated by arrow "a." This force maintains the relative position of the pivot point 31 of force distribution bar 30. The force of any load applied to the wheel axle assemblies 1 and 1' is transmitted through brackets 15 and 15' and brackets 19 and 19' and through secondary tensioning members 8a and 8a. The transmitted force for each wheel axle assembly is thus applied to opposite ends of the force distribution bar 30. The force distribution bar balances or distributes the applied forces by proportionally pivoting about pivot point 31. For Example, FIG. 8b depicts a situation in which a greater force is applied to wheel axle assembly 1'. As a result of the greater force which is applied to wheel axle assembly 1', secondary tensioning member 8b applies a greater force (pulls more) on the lower end of force distribution bar 30, and as a result, force distribution bar 30 pivots about pivot point 31 as indicated in FIG. 8b. Forces which are independently applied to each wheel axle assembly can include those that are due to uneven surfaces under the wheeled vehicle. Accordingly, the self-adjusting mechanism of FIGS. 8a and 8b can be used to compensate for uneven surfaces while the wheeled vehicle is stationary or moving.

The force distribution bar 30 in FIGS. 8a and 8b can have any convenient shape including triangular or rectangular shapes. In addition, the pivot point 31 could be off-center if desired to effect a variation in the force distribution. The force distribution bar 30 is an example of a mechanical means for balancing the forces applied to two axles. In addition to mechanical means, hydraulic or pneumatic means, such as fluid piston assemblies could be used to distribute the forces applied to the two wheel axle assemblies.

The suspension system of the present invention can be used in combination with wheeled vehicles which have more than one load-bearing axle. For example, when used in combination with a dual axle trailer, one or both of the axles could include the rotatable off-set axles of the present invention. Rotating one of the axles would allow for the trailer to be tilted about the other axle. Rotating both axles would allow the trailer to be raised and lowered, or tilted if one of the ends thereof were supported. When using two or more off-set axles, an equal number or fewer tensioning members and tensioning means could be used to effect rotation of the axles.

Although the suspension system of the present invention has been described above as being useful for lowering and/or tilting wheeled vehicles such as trailers for loading, it is to be understood that the suspension system could also be primarily used for raising the body, bed or frame of a wheeled vehicle for purposes of increasing the vehicle's ground clearance.

The suspension system of the present invention can be used in conjunction with both motorized and non-motorized vehicles. One application of the suspension system of the present invention is to lower vehicles for access thereto by handicapped persons, including persons bound in wheelchairs. The suspension system of the present invention will allow vehicles such as campers, concession stands, storage trailers, etc. to be lowered onto leveling pads, stands or other supports without the need of jacks or other auxiliary lifting or leveling means.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. A suspension system for a wheeled vehicle which comprises:
    an axle having wheels coupled to opposite ends thereof and a central portion, the wheels having central axes which are aligned with one another and the central portion having a central axis which is off-set from the aligned central axes of the wheels; and
    means for rotating the central portion of the axle along an arc relative to a frame so as to cause the wheels to move along an arc,
    wherein the means to rotate the central portion of the axle comprises a tensioning member having first and second ends with the first end thereof coupled to the central portion of the axle.

2. A suspension system for a wheeled vehicle according to claim 1, wherein the second end of the tensioning means is coupled to a means for applying tension to the tensioning member.

3. A suspension system for a wheeled vehicle according to claim 2, wherein the means for applying tension to the tensioning member includes a shuttle to which the second end of the tensioning means is coupled.

4. A suspension system for a wheeled vehicle according to claim 3, wherein the shuttle is detachably coupled to another tensioning member, and transmits tension between the tensioning members.

5. A suspension system for a wheeled vehicle according to claim 4, wherein the shuttle is provided with a locking member which prevents movement of the shuttle.

6. A suspension system for a wheeled vehicle according to claim 2 wherein the means for applying tension comprises a winch.

7. A suspension system for a wheeled vehicle according to claim 1, further comprising guide means for the tensioning member.

8. A suspension system for a wheeled vehicle according to claim 1, wherein the axle includes arm members on opposite ends which are coupled between the central portion and the wheels.

9. A suspension system for a wheeled vehicle according to claim 8, further including brackets which are attached to the arm members and provide pivot points for the axle.

10. A suspension system for a wheeled vehicle according to claim 9, further comprising means for locking the position of the wheels with respect to a frame of a wheeled vehicle.

11. A suspension system for a wheeled vehicle according to claim 2, further comprising another tensioning member connected between the axle and the means for applying tension.

12. A suspension system for a wheeled vehicle according to claim 1, wherein the wheeled vehicle is motorized.

13. A suspension system for a wheeled vehicle according to claim 1, wherein the wheeled vehicle comprises a truck.

14. A wheeled vehicle which comprises:

a frame;

an axle having wheels coupled to opposite ends thereof and a central portion, the wheels having central axes which are aligned with one another and the central portion having a central axis which is off-set from the aligned central axes of the wheels;

means for pivotally coupling the axle to the frame; and means for rotating the central portion of the axle along an arc relative to said frame, so as to cause the wheels to move along an arc, wherein the means to rotate the central portion of the axle comprises a tensioning member having first and second ends with the first end thereof coupled to the central portion of the axle and the second end of the tensioning means coupled to a means for applying tension to the tensioning member.

15. A wheeled vehicle according to claim 14, wherein the means for applying tension to the tensioning member includes a shuttle to which the second end of the tensioning means is coupled.

16. A wheeled vehicle according to claim 15, wherein the shuttle is detachably coupled to another tensioning member, and transmits tension between the tensioning members.

17. A wheeled vehicle according to claim 16, wherein the shuttle is provided with a locking member which prevents movement of the shuttle.

18. A wheeled vehicle according to claim 14, further comprising:

another axle having wheels coupled to opposite ends thereof and a central portion, the wheels having central axes which are aligned with one another and the central portion having a central axis which is off-set from the aligned central axes of the wheels;

means for pivotally coupling the another axle to the frame; and means for rotating the central portion of the another axle, so as to cause the wheels to move along an arc.

19. A wheeled vehicle according to claim 18, further comprising:

means for distributing forces applied to each axle, between each axle.

20. A wheeled vehicle according to claim 14, wherein the wheeled vehicle is motorized.

21. A wheeled vehicle according to claim 14, wherein the wheeled vehicle comprises a truck.

22. A method of loading a trailer having a frame and an axle which method comprises:

lowering at least a portion of the trailer by applying a tensional force to a central portion of the axle and thereby rotating the central portion of the axle of the trailer along an arc relative to the frame thereof; and loading the trailer while the portion thereof is lowered.

23. A method according to claim 22, wherein the lowering comprises tilting the trailer.

* * * * *